US012403571B2

(12) United States Patent
Shi et al.

(10) Patent No.: US 12,403,571 B2
(45) Date of Patent: Sep. 2, 2025

(54) TORQUE WRENCH WITH STRAIN GAUGES

(71) Applicant: Apex Brands, Inc., Apex, NC (US)

(72) Inventors: Minglin Shi, Shanghai (CN); Henglian Luo, Shanghai (CN); Cheng Yang, Shanghai (CN)

(73) Assignee: APEX BRANDS, INC., Apex, NC (US)

( * ) Notice: Subject to any disclaimer, the term of this patent is extended or adjusted under 35 U.S.C. 154(b) by 292 days.

(21) Appl. No.: 17/912,074

(22) PCT Filed: Mar. 25, 2020

(86) PCT No.: PCT/CN2020/081207
§ 371 (c)(1),
(2) Date: Sep. 16, 2022

(87) PCT Pub. No.: WO2021/189326
PCT Pub. Date: Sep. 30, 2021

(65) Prior Publication Data
US 2023/0182272 A1 Jun. 15, 2023

(51) Int. Cl.
*B25B 23/142* (2006.01)
*B25G 1/04* (2006.01)

(52) U.S. Cl.
CPC ...... *B25B 23/1427* (2013.01); *B25B 23/1425* (2013.01); *B25G 1/043* (2013.01)

(58) Field of Classification Search
CPC .............. B25B 23/142; B25B 23/1425; B25B 23/1427
See application file for complete search history.

(56) References Cited

U.S. PATENT DOCUMENTS 4,006,629 A * 2/1977 Barrett ................ B25B 23/1425 73/862.26
4,958,541 A * 9/1990 Annis ................. B25B 23/1425 81/479

(Continued)

FOREIGN PATENT DOCUMENTS

CN 101417414 A 4/2009
CN 201579745 U 9/2010

(Continued)

OTHER PUBLICATIONS

Examination Report issued in corresponding Taiwanese Application No. 111128040 on Sep. 19, 2023, all enclosed pages cited herein.

(Continued)

*Primary Examiner* — David B. Thomas
(74) *Attorney, Agent, or Firm* — BURR & FORMAN

(57) ABSTRACT

An example torque wrench is provided. The example torque wrench may include a drive head configured to engage with a tool for rotating a fastener. The drive head may have a drive axis about which the drive head rotates when rotating the fastener. The torque wrench may also include a deflection member coupled to the drive head and an outer body coupled to the deflection member at a first loading point and a second loading point. The torque wrench may also include a first strain gauge coupled to the deflection member between the drive head and the first loading point, and a second strain gauge coupled to the deflection member between the first loading point and the second loading point.

21 Claims, 11 Drawing Sheets

(56) References Cited

U.S. PATENT DOCUMENTS

| | | | | |
|---|---|---|---|---|
| 4,982,612 | A * | 1/1991 | Rittmann | G01L 1/225 73/862.26 |
| 5,109,737 | A * | 5/1992 | Raber | B25B 13/461 81/177.1 |
| 5,911,798 | A * | 6/1999 | Arnold | B25B 13/461 81/177.1 |
| D422,193 | S * | 4/2000 | Walker | D8/107 |
| 6,761,094 | B2 * | 7/2004 | Tobako | B25G 1/043 403/328 |
| 6,968,759 | B2 * | 11/2005 | Becker | B25B 23/1425 81/479 |
| 6,981,436 | B2 * | 1/2006 | Becker | B25B 23/1425 81/479 |
| 7,082,865 | B2 * | 8/2006 | Reynertson, Jr. | B25B 23/1425 81/479 |
| 7,089,834 | B2 * | 8/2006 | Reynertson | B25B 23/14 81/479 |
| 7,234,378 | B2 | 6/2007 | Reynertson | |
| 8,844,381 | B2 * | 9/2014 | Gharib | B25B 23/1425 81/479 |
| 9,308,633 | B2 * | 4/2016 | Gharib | B25B 23/1425 |
| 10,562,161 | B2 * | 2/2020 | Flath | G01L 5/24 |
| 10,611,014 | B2 * | 4/2020 | Lazarov | B25G 1/043 |
| 11,701,762 | B2 * | 7/2023 | Shi | B25B 23/1427 81/479 |
| 2010/0147118 | A1 * | 6/2010 | Hsieh | B25B 23/1427 81/477 |
| 2015/0013475 | A1 | 1/2015 | Gharib | |
| 2015/0273680 | A1 | 10/2015 | Lai | |
| 2022/0266428 | A1 * | 8/2022 | Boccellato | B25B 23/1425 |
| 2022/0347822 | A1 * | 11/2022 | Locatelli | B25B 23/0035 |
| 2022/0395969 | A1 * | 12/2022 | Boccellato | B25B 23/1425 |

FOREIGN PATENT DOCUMENTS

| | | | |
|---|---|---|---|
| CN | 102241004 | A | 11/2011 |
| CN | 208084232 | U | 11/2018 |
| DE | 3512969 | A1 | 10/1986 |
| DE | 202004003978 | U1 | 6/2004 |
| EP | 0362696 | B1 | 12/1993 |
| EP | 2353789 | A2 | 8/2011 |
| TW | I609746 | B | 4/2015 |

OTHER PUBLICATIONS

International Preliminary Report on Patentability issued in corresponding International Application No. PCT/CN2020/081207 on Sep. 22, 2022, all enclosed pages cited herein.

Office Action issued in corresponding Canadian Application No. 3,176,871 on Jan. 25, 2024, all enclosed pages cited.

Partial European Search Report issued in corresponding European Application No. 20927154.3 on Nov. 20, 2023, all enclosed pages cited herein.

International Search Report and Written Opinion of corresponding International Application No. PCT/CN2020/081207, mailed on Dec. 31, 2020, all enclosed pages cited herein.

Examination Report of corresponding Australian Application No. 2020438391, mailed on Sep. 22, 2023, all enclosed pages cited herein.

Extended European Search Report issued in corresponding European Application No. 20927154.3 on Jun. 12, 2024, all enclosed pages cited herein.

* cited by examiner

TORQUE WRENCH WITH STRAIN GAUGES

TECHNICAL FIELD

Example embodiments generally relate to wrenches, and in particular to electronic torque wrench technology.

BACKGROUND

Wrenches are often employed to engage with various types of fasteners to provide a user with leverage, via a handle, to turn the fastener. In some applications, fasteners must be tightened to particular, specified torque. To ensure proper tightening, a torque wrench may be used, which is a wrench that indicates, either mechanically or electrically, that a desired torque has been applied to the fastener. A torque wrench may be set to a desired torque, and the wrench may indicate when that torque setting has been reached when tightening a fastener.

Many electronic torque wrenches use a strain gauge to measure the torque being applied to a fastener by the wrench. However, in conventional torque wrenches, the location where the force on the handle is applied (e.g., close to the head of the wrench or close to the end of the handle) may have an impact on the reading provided by the strain gauge when the same torque is actually being applied. As such, the measurement accuracy of a conventional torque wrench may be limited when the force on the handle is moved away from an ideal force applied location on the handle. Further, in some applications, placement of the force at the exact location on the handle may be difficult or impossible, leading to incorrect torque measurements. As such, there is a need for a torque wrench that is capable of measuring the torque more accurately when the position of the applied force on the handle is moved to different locations.

BRIEF SUMMARY OF SOME EXAMPLES

According to some example embodiments, an example torque wrench is provided. The torque wrench may comprise a drive head configured to engage with a tool for rotating a fastener. The drive head may have a drive axis about which the drive head rotates when rotating the fastener. Further, the torque wrench may comprise a deflection member coupled to the drive head, and an outer body coupled to the deflection member at a first loading point and a second loading point. The torque wrench may also comprise a first strain gauge coupled to the deflection member between the drive head and the first loading point, and a second strain gauge coupled to the deflection member between the first loading point and the second loading point.

According to some example embodiments, another example torque wrench is provided. The torque wrench may comprise a drive head configured to engage with a tool for rotating a fastener. The drive head may have a drive axis about which the drive head rotates when rotating the fastener. The torque wrench may also comprise a deflection member coupled to the drive head and a handle coupled to the deflection member at a first loading point and a second loading point. The torque wrench may further comprise a first strain gauge coupled to the deflection member between the drive head and the first loading point, and a second strain gauge coupled to the deflection member between the first loading point and the second loading point. Additionally, the torque wrench may comprise processing circuitry electrically coupled to the first strain gauge and the second strain gauge and configured to measure a voltage between an output of the first strain gauge and an output of the second strain gauge. The voltage may be based on a torque being applied to the fastener.

According to some example embodiments, an example method for measuring a torque applied by a drive head of a torque wrench to a fastener is also provided. The torque wrench may comprise a deflection member coupled to the drive head. The method may comprise measuring, by processing circuitry, a voltage between an output of a first strain gauge and an output of a second strain gauge. In this regard, the voltage may be based on a torque being applied to the fastener. The first strain gauge may be coupled to the deflection member between the drive head and a first loading point, and the second strain gauge may be coupled to the deflection member between the first loading point and a second loading point. The first loading point and the second loading point may be points of mechanical coupling between the deflection member and a handle of the torque wrench. The method may also comprise converting the measured voltage into a torque measurement.

According to some example embodiments, a torque wrench may comprise a drive head configured to engage with a tool for rotating a fastener. The drive head may have a drive axis about which the drive head rotates when rotating the fastener. The torque wrench may also comprise a deflection member coupled to the drive head, a handle coupled to the deflection member, and a strain gauge assembly coupled to the deflection member. The strain gauge assembly may be configured to measure strain on the deflection member as an indication of a torque being applied to the fastener by the torque wrench. The torque wrench may further comprise a handle extender coupled to the handle. The handle extender may be configured to be removable from the handle by a user or installed on the handle by the user. The handle extender may be configured to increase a handle length of the torque wrench relative to the handle length without the handle extender coupled to the handle. Additionally, the handle may be coupled to the deflection member at a first loading point and a second loading point. Further, the strain gauge assembly may comprise a first strain gauge coupled to the deflection member between the drive head and the first loading point, and a second strain gauge coupled to the deflection member between the first loading point and the second loading point.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

DETAILED DESCRIPTION

Figure 1:
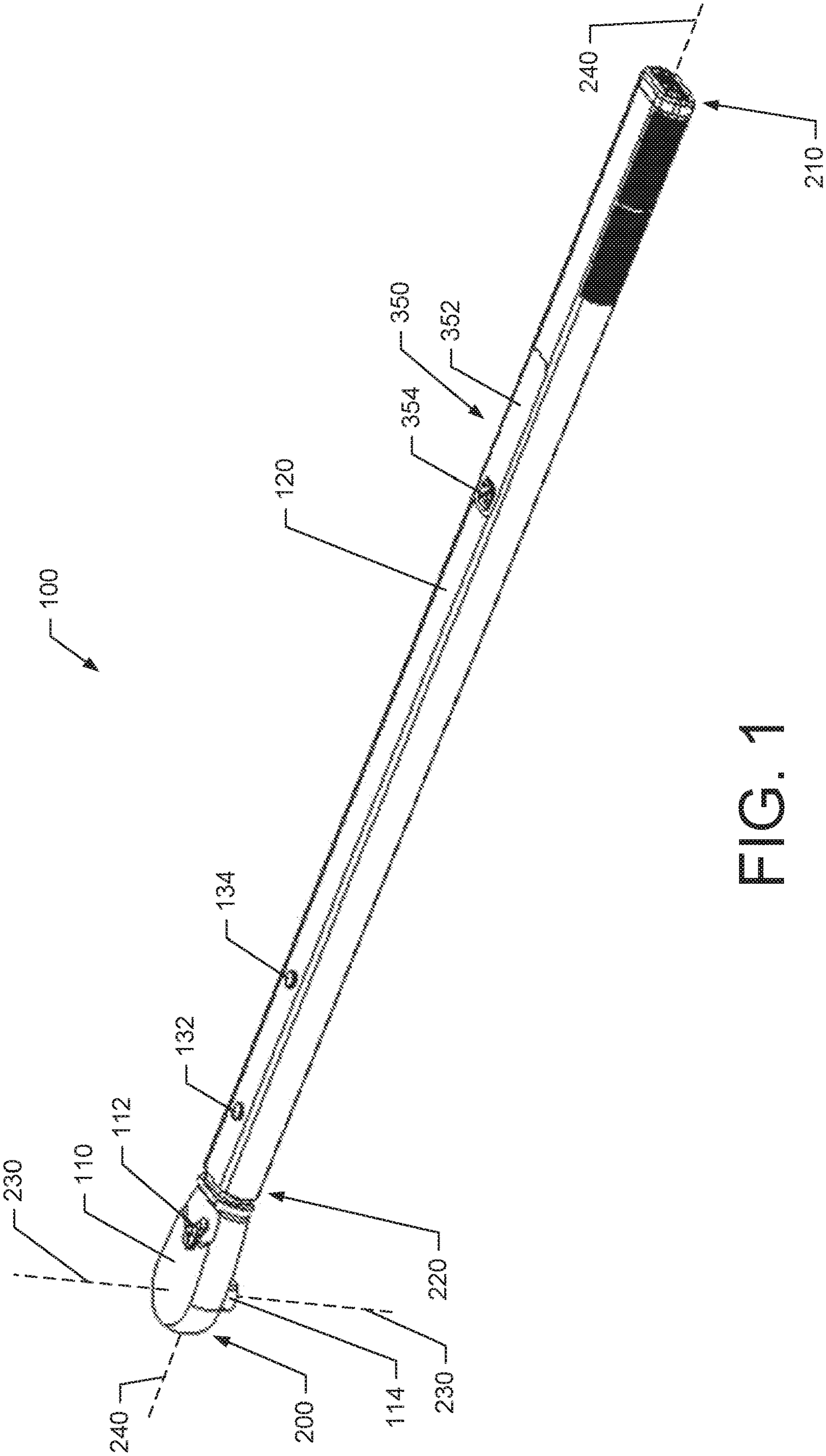
FIG. 1 illustrates an example torque wrench according to some example embodiments.

Some example embodiments now will be described more fully hereinafter with reference to the accompanying drawings, in which some, but not all example embodiments are shown. Indeed, the examples described and pictured herein should not be construed as being limiting as to the scope, applicability, or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

According to some example embodiments, an example torque wrench is described herein that measures a torque applied to a fastener accurately, regardless of where the turning force is applied to the handle of the torque wrench (e.g., the hand position). In this regard, according to some example embodiments, two or more strain gauges may be integrated into the torque wrench that facilitate the ability make accurate torque measurements regardless of the location of the applied force. For example, two strain gauges may be included on a deflection member of the torque wrench that is affixed the drive head. The deflection member may also be affixed to the handle of the torque wrench at two locations, which may be referred to as loading points because the force applied to the handle is transferred to the deflection member at these affixing locations.

The strain gauges may be positioned on the deflection member in relation to the axis of rotation of the drive head (i.e., the drive axis) and the two loading points. According to some example embodiments, the first strain gauge may be positioned on the deflection member rearward of the axis of rotation of the drive head and forward of the first loading point. The second strain gauge may be positioned on the deflection member rearward of the first loading point and forward of the second loading point. According to some example embodiments, the positioning of the strain gauges may be defined based on equivalent distancing ratios. In this regard, for example, a ratio of the distance between the drive axis and the first strain gauge divided by the distance between the drive axis and the first loading point may be equal to a ratio of the distance between the second loading point and the second strain gauge divided by the distance between the first loading point and the second loading point. According to some example embodiments, positioning the strain gauges in accordance with these ratios, and electrically connecting the strain sensors of the strain gauges as described herein may permit accurate measurement of the torque applied to the fastener, regardless of the position of the force that is applied to the handle. In this regard, each strain gauge may comprise one or more strain sensors.

To further describe these aspects, as well as others, reference is now made to FIG. 1, which illustrates an example torque wrench 100 according to some example embodiments. For reference, the torque wrench 100 may have a forward end 200 and a rearward end 210. The torque wrench 100 comprises a drive head 110 and a handle 120. The drive head 110 may be disposed at the forward end 200 of the torque wrench 100 and, for example, may be a ratcheting drive head comprising a drive tang 114 and a reversing lever 112. In this regard, the drive head 110 and the drive tang 114 may rotate about an axis of rotation (i.e., the drive axis 230). The drive head 110, and more specifically the drive tang 114 may be configured to engage with a tool, such as, for example, a socket or a driver bit, that can engage with, and rotate, a corresponding fastener (e.g., a bolt, nut, screw, or the like). Based on the positioning of the reversing lever 112, the drive tang 114 may be configured to apply a fastener driving force in a first rotational direction and freely ratchet in a second rotational direction that is opposite the first rotational direction.

The handle 120 may be an elongate member that extends along a longitudinal axis 240 of the torque wrench 100. The handle 120 may be disposed rearward of the drive head 110 and may be coupled to the drive head 110 via the deflection member 150 (FIG. 2) at a forward end of the handle 120 via, for example, pins 132 and 134 as further described below. The handle 120 may also include a user interface 350 that may be disposed on the handle 120. In this regard, the user interface 350 may comprise a display 352 and a keypad 354. The display 352 may be controlled by processing circuitry (further described below) to provide visual information such as, for example, a torque measurement indicating an amount of torque currently being applied to a fastener by the torque wrench 100. According to some example embodiments, the display 352 may also be an input device, in the form of, for example, a touch screen display. The keypad 354 may comprise one or more keys or buttons that permit a user to input data for receipt by the processing circuitry. In this manner, for example, the user may input data indicating a torque threshold setting.

Figure 2:
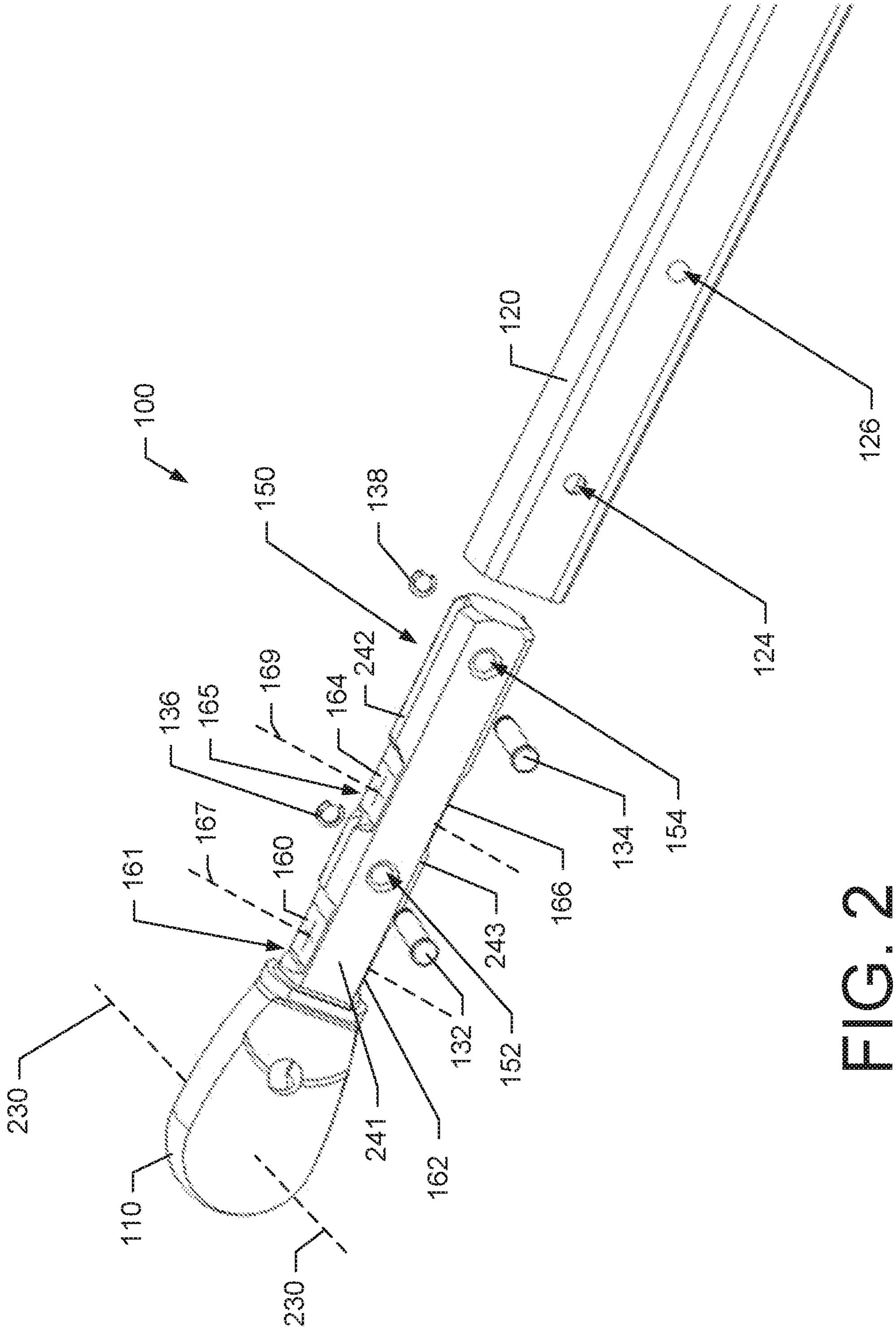
FIG. 2 illustrates an exploded view of a forward portion of the torque wrench of FIG. 1 providing a view of the deflection member according to some example embodiments.

Now referring to FIG. 2, an exploded view of the forward portion of the torque wrench 100 is illustrated, providing a view of the deflection member 150. In this regard, the deflection member 150 may be an elongate extension that is coupled to the drive head 110 at a forward end of the deflection member 150. The deflection member 150 may include four surfaces that extend along a length of the deflection member 150. In this regard, the deflection member 150 may have a back face 241 and a front face (not visible) opposite the back face 241, each of which are disposed on respective planes that are orthogonal to the drive axis 230. The deflection member 150 may also include a first side 242 and a second side 243. The first side 242 may be disposed on an opposite side of the deflection member 150 from the second side 243. Additionally, the first side 242 and the second side 243 may be positioned such that the first side 242 and the second side 243 are under a strain force when a moment is applied about the drive axis 230. In this regard, the first side 242 and the second side 243 may be defined on respective planes that are parallel to the drive axis 230.

As mentioned above, to provide added leverage to the user when using the torque wrench 100, the deflection member 150 may be coupled to an outer body or handle 120. In this regard, the outer body may comprise the handle 120. The handle 120 may be a tubular member with a longitudinally directed opening at the forward end of the handle 120. The deflection member 150 may be inserted into the opening in the forward end of the handle 120, and rigidly coupled or affixed to the handle 120 at a first loading point and a second loading point (e.g., points of mechanical coupling). In this regard, the loading points may be locations where the deflection member 150 is coupled or affixed to the handle 120. According to some example embodiments, the loading points may be positioned centrally on the deflection member 150 to couple the front face and the back face of the deflection member 150 to the handle 120 at the loading points. According to some example embodiments, the only mechanical coupling between the deflection member 150 and the handle 120 is at the loading points. According to some example embodiments, the loading points may be positioned to be in linear alignment with each other and the drive axis 230.

Figure 4:
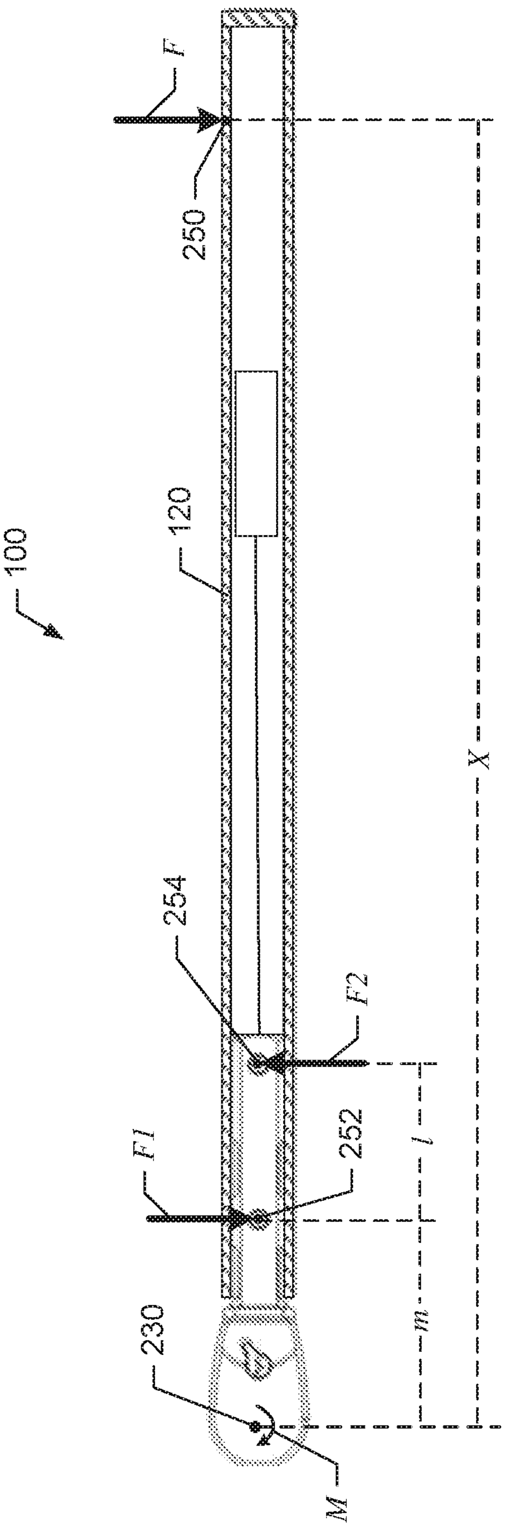
FIG. 4 illustrates a cross-section view of the torque wrench of FIG. 1 being subjected to an applied force according to some example embodiments.

According to some example embodiments, to form the loading points, the deflection member 150 may include openings 152 and 154 that may pass through the deflection member 150 from the back face 241 to the front face. The handle 120 may have corresponding openings 124 and 126 on the back face of the handle 120, as well as corresponding openings on the front face of the handle 120. As such, when the deflection member 150 is inserted into the longitudinal opening in the forward end of the handle 120, the openings 152 and 154 may be aligned with the corresponding openings 124 and 126 (as well as the openings on the front face of the handle 120). With these openings aligned, according to some example embodiments, the pin 132 may be inserted through the respective openings in the handle 120 and the deflection member 150 and secured in place with the ring lock 136 to form the first loading point 252 (FIG. 4) of the torque wrench 100. Similarly, according to some example embodiments, the pin 134 may be inserted through the respective openings in the handle 120 and the deflection member 150 and secured in place with the ring lock 138 to form the second loading point 254 (FIG. 4). According to some example embodiments, while the use of pins 132 and 134 may be one manner to affix the deflection member 150 to the handle 120 to form the first loading point 252 and the second loading point 254, it is understood that any type of mechanical coupling technique may be used to affix the handle 120 to the deflection member 150 at two points to form the first loading point 252 and the second loading point 254 at their respective positions.

According to some example embodiments, a plurality of strain gauges may be disposed on or integrated with the deflection member 150. While example embodiments described herein comprise two strain gauges, it is contemplated that more than two strain gauges may be utilized according to some example embodiments. Referring the example embodiments as shown in FIG. 2, a first strain gauge 161 and a second strain gauge 165 may be disposed on, or integrated with, the deflection member 150. The first strain gauge 161 may comprise one or more strain sensors, and the second strain gauge 165 may comprise one or more strain sensors. In this example embodiment of the torque wrench 100 shown in FIGS. 2 through 7, the torque wrench 100 is shown with the first strain gauge 161 comprising two strain sensors and the second strain gauge 165 comprising two strain sensors. However, it is understood and contemplated that a strain gauge, according to some example embodiments, may comprise any number of strain sensors to determine a strain on the deflection member 150 at a position of the strain gauge.

In this regard, the first strain gauge 161 may comprise a first strain sensor 160 and a second strain sensor 162. Similarly, the second strain gauge 165 may comprise a third strain sensor 164 and a fourth strain sensor 166. According to some example embodiments, each of the strain sensors may be resistive elements that change an electrical resistance across the strain sensor in proportion with an amount of strain that is applied to the strain sensor. Accordingly, when affixed to a surface (e.g., a surface of the deflection member 150), an electrical resistance of the strain sensor may change based on the amount of strain being applied to the surface where the strain sensor has been applied. According to some example embodiments, the strain sensors may be formed as conductive traces that are applied or deposited on to the deflection member 150. The conductive traces may have a serpentine-shape that causes the electrical resistance across the conductive trace to change as a function of the strain applied to the conductive trace. Due to the known relationship between the electrical resistance and the applied strain, a measurement of the strain applied to the strain sensor can be determined based on the electrical resistance.

As such, the first strain gauge 161, with the first strain sensor 160 and the second strain sensor 162, may be disposed on the deflection member 150 at a position between the drive axis 230 and the first loading point 252 (as defined by the position of the pin 132). The first strain sensor 160 may be disposed on the first side 242 of the deflection member 150 and the second strain sensor 162 may be disposed on the second side 243 of the deflection member 150. The first strain sensor 160 and the second strain sensor 162 may be disposed such that the first strain sensor 160 and the second strain sensor 162 are symmetrical about a first strain gauge alignment axis 167 that passes centrally through first strain sensor 160, the second strain sensor 162, and the deflection member 150 (from the first side 242 to the second side 243) and is orthogonal to the drive axis 230. According to some example embodiments, to protect the first strain sensor 160 and the second strain sensor 162 from interaction with the interior surfaces of the handle 120, the first strain sensor 160 and the second strain sensor 162 may be disposed in respective recesses on the first side 242 and second side 243 of the deflection member 150.

Similarly, the second strain gauge 165, with the third strain sensor 164 and the fourth strain sensor 166, may be disposed on the deflection member 150 at a position between the first loading point 252 (as defined by the position of the pin 132), and the second loading point 254 (as defined by the position of the pin 134). The third strain sensor 164 may be disposed on the first side 242 of the deflection member 150 and the fourth strain sensor 166 may be disposed on the second side 243 of the deflection member 150. The third strain sensor 164 and the fourth strain sensor 166 may be disposed such that the third strain sensor 164 and the fourth strain sensor 166 are symmetrical about a second strain gauge alignment axis 169 that passes centrally through third strain sensor 164, the fourth strain sensor 166, and the deflection member 150 (from the first side 242 to the second side 243) and is orthogonal to the drive axis 230. According to some example embodiments, to protect the third strain sensor 164 and the fourth strain sensor 166 from interaction with the interior surfaces of the handle 120, the third strain sensor 164 and the fourth strain sensor 166 may be disposed in respective recesses on the first side 242 and second side 243 of the deflection member 150.

Figure 3:
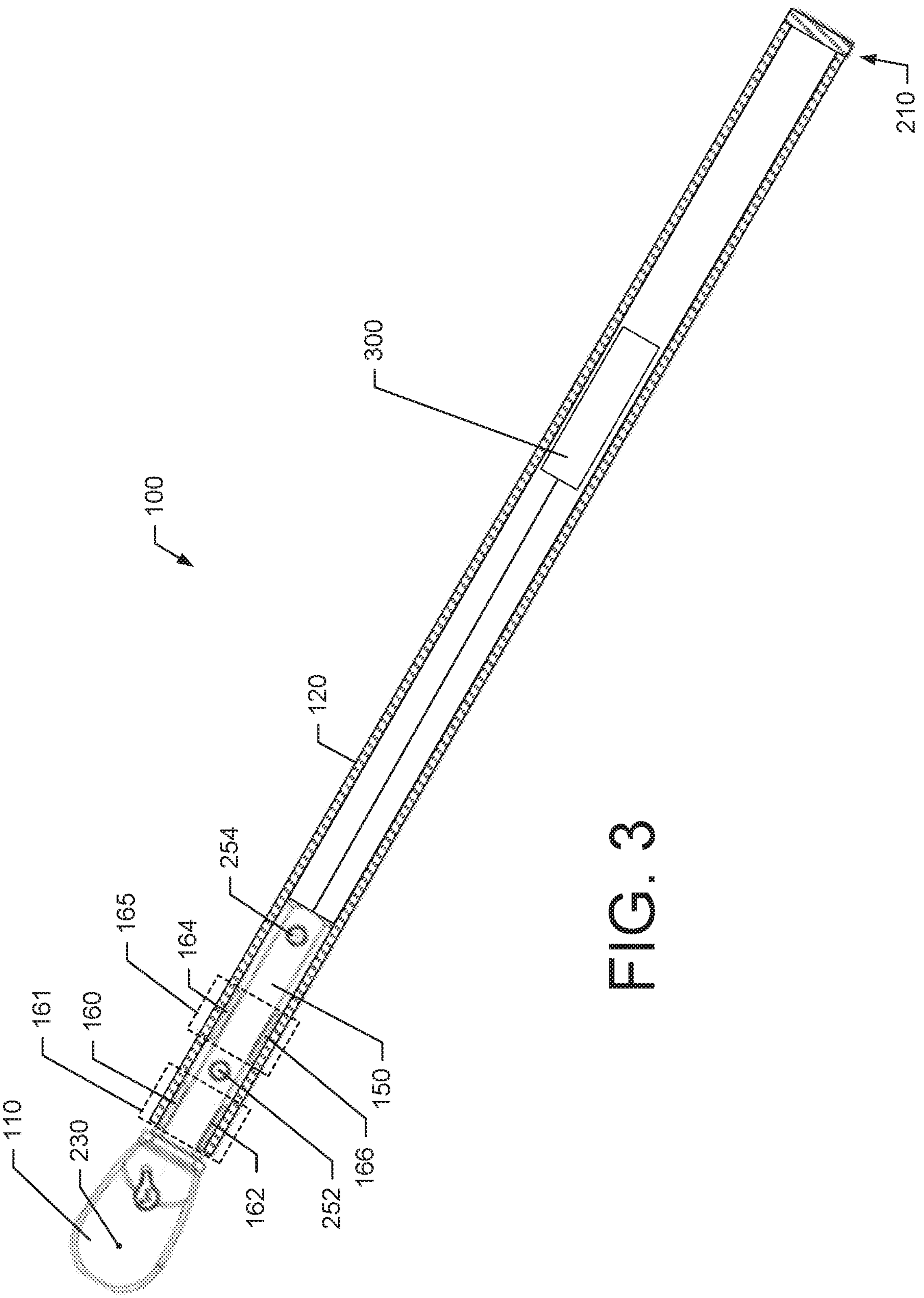
FIG. 3 illustrates a cross-section view of the torque wrench of FIG. 1 in a fully assembled configuration according to some example embodiments.

Now referring to FIG. 3, a cross-section view of the torque wrench 100 is shown in a fully assembled configuration. As such, the first strain gauge 161 (comprising the first strain sensor 160 and the second strain sensor 162) is shown in a position disposed between the drive axis 230 (indicated by a dot due to the orientation of the torque wrench 100 in FIG. 3) and the first loading point 252. Additionally, the positioning of the second strain gauge 165 (comprising the third strain sensor 164 and the fourth strain sensor 166) is shown in a position disposed between the first loading point 252 and the second loading point 254. An electronics assembly 300 is also shown as being disposed within the handle 120, with an electrical connection to the first strain gauge 161 and the second strain gauge 165 disposed on the deflection member 150.

Figure 5:
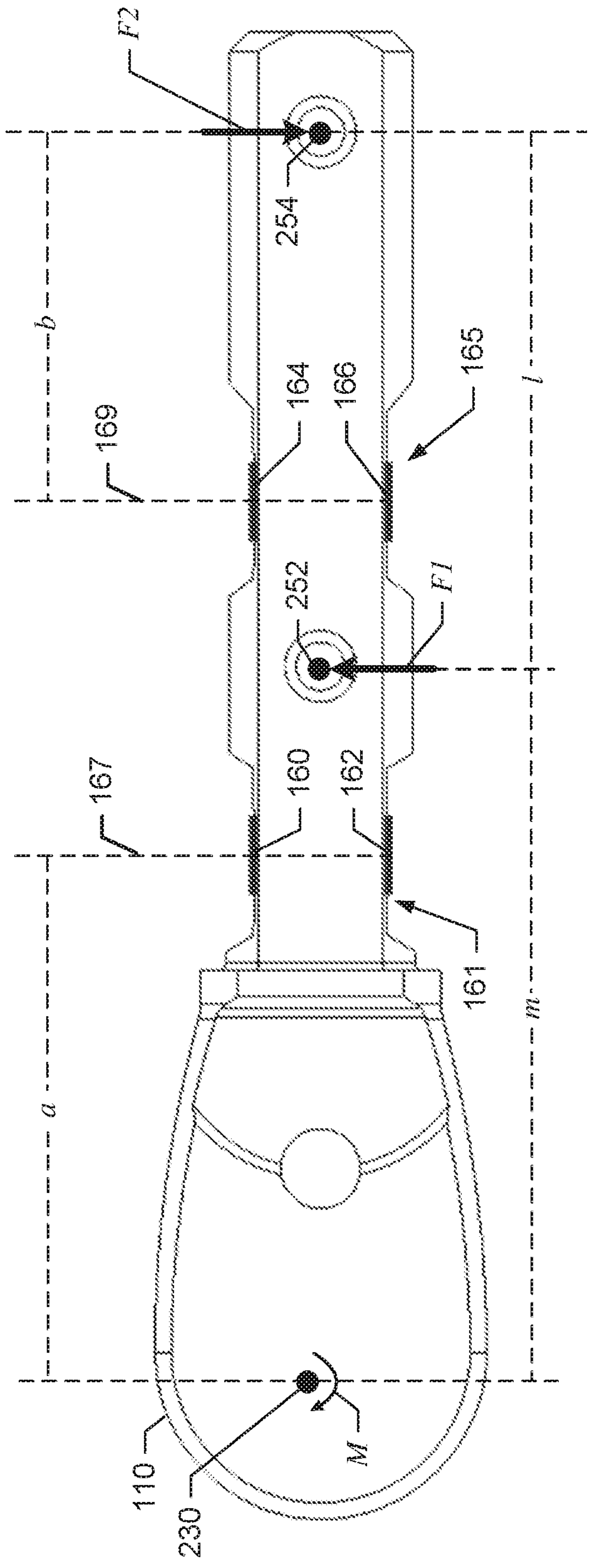
FIG. 5 illustrates a force diagram for the drive head and the deflection member resulting from the force applied in FIG. 4 according to some example embodiments.
Figure 6:
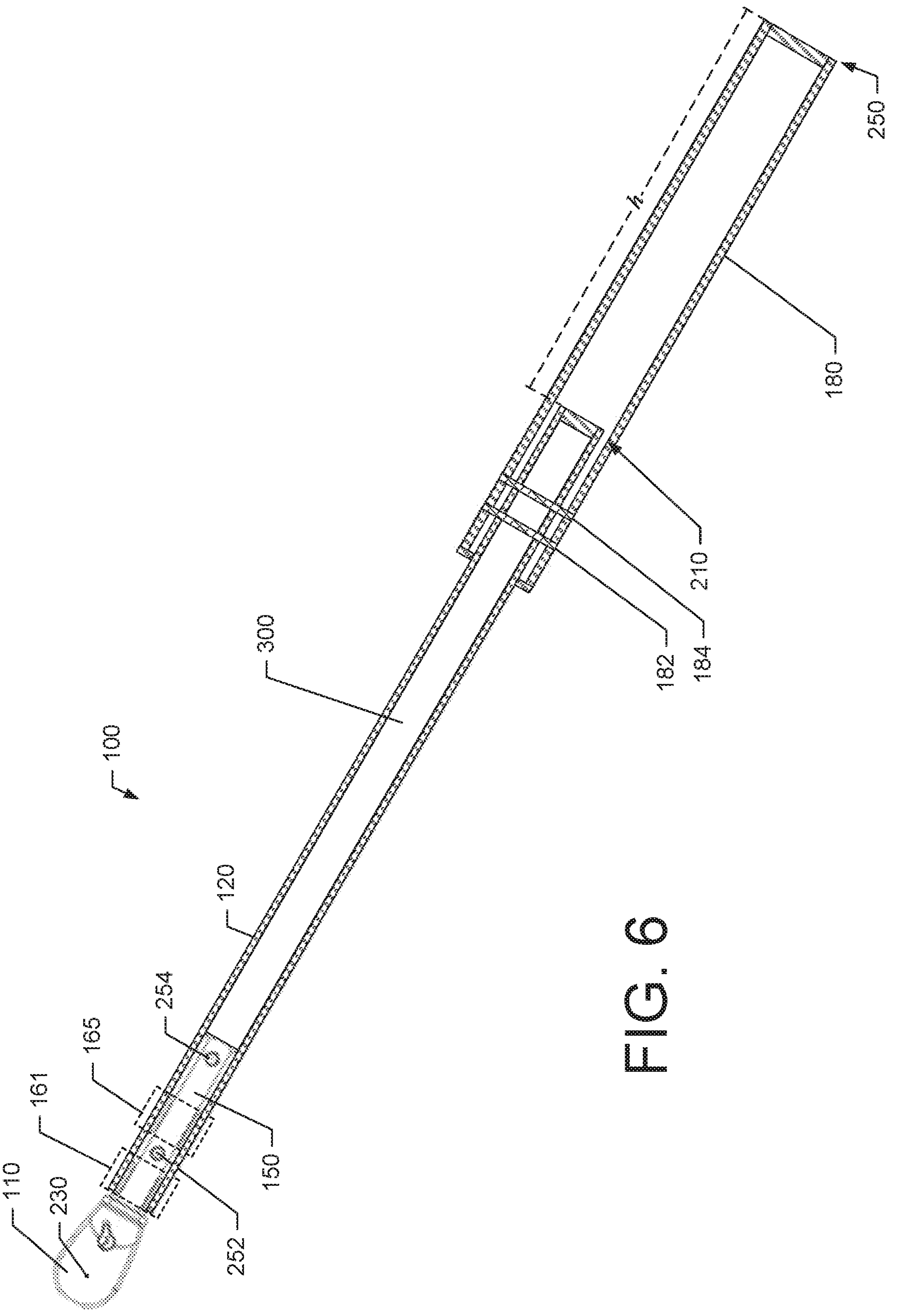
FIG. 6 illustrates a cross-section view of a torque wrench with a handle extender according to some example embodiments.

With reference to FIGS. 4 and 5, an example embodiment of the torque wrench 100 and the deflection member 150 are shown in association with forces resulting from a turning force F applied to handle 120. Additionally, the distances between various elements are defined to facilitate description of the positioning and relationships between the elements. With respect to the distances between the elements, a defines a distance between the drive axis 230 and the first strain gauge 161 (or more specifically, the first strain gauge alignment axis 167); b defines a distance between the second loading point 254 and the second strain gauge 165 (or more specifically, the second strain gauge alignment axis 169); m defines a distance between drive axis 230 and the first loading point 252; and l defines a distance between the first loading point 252 and the second loading point 254.

With respect to the applied force F, X defines a distance between the drive axis 230 and a point 250 on the handle 120 where the force F is applied. Force F is applied in a circumstance where the torque wrench 100 is engaged with, for example, a fastener to generate a moment M at the drive axis 230 where the system of forces result in equilibrium (i.e., moment and force equilibrium). Because force F, as shown in FIG. 4, is applied in an downward direction, translation of the force F through the handle 120 results in component forces of F being applied to the deflection member 150 at the first loading point 252 and the second loading point 254. In this regard, the component force F1 applied by the handle 120 at the first loading point 252 and is also directed is directed downward. Further, the component force applied by the handle 120 at the second loading point 254 is defined as F2 and is directed upward based on the downward orientation of the force F.

Based on the moment equilibrium of the torque wrench 100, the relationship at the first loading point 252 may be represented by:

$$F*(X-m)=F2*l \quad (1).$$

Similarly, due to the force equilibrium of the system, the relationship of the forces may be represented by:

$$F2=F+F1 \quad (2)$$

Based on (1) and (2) the following relationships can be defined as follows:

$$F1=\frac{F*(X-m-l)}{l} \quad (3)$$

and:

$$F2=\frac{F*(X-m)}{l}. \quad (4)$$

Referring now to FIG. 5, the force diagram with respect to the deflection member 150 is shown, and it is noted that forces F1 and F2 are oriented in opposite directions relative the forces applied by the handle 120 in FIG. 4. Accordingly, the moments at the first strain gauge 161 and the second strain gauge 165 may be defined with reference to the first strain gauge alignment axis 167 and the second strain gauge alignment axis 169. In this regard, the bending moment M1 at the first strain gauge alignment axis 167 may be defined as:

$$M1=F2*(l+m-a)-F1*(m-a) \quad (5).$$

Substituting (3) and (4) into equation (5) yields:

$$M1=F*(X-a) \quad (6).$$

Similarly, the bending moment M2 at the second strain gauge alignment axis 169 may be defined as:

$$M2=F2*b \quad (7).$$

Substituting (4) into equation (7) yields:

$$M2=F*(X-m)*b/l \quad (8).$$

As such, using on the relationships defined in equations (7) and (8) the difference in the moments can be defined as:

$$M1-M2=F*X*\left(1-\frac{b}{l}\right)+F*\left(\frac{m*b}{l}-a\right). \quad (9)$$

Additionally, since the torque applied by the torque wrench 100 may be defined as T=F*X, then element $$\left(\frac{m*b}{l}-a\right)$$

can be set to be equal to zero, according to some example embodiments, and thus the resulting relationship can be defined as:

$$M1-M2=T*\left(1-\frac{b}{l}\right). \quad (10)$$

Based on equation (10), the difference between the strain applied to the first strain gauge 161 and the strain applied to the second strain gauge 165 is not dependent upon the position of the force F, if, as provided in the following:

$$\frac{a}{m}=\frac{b}{l}. \quad (11)$$

As such, according to some example embodiments, when this condition, as provided in equation (11), is met by the architecture of the torque wrench 100, a torque measurement can be determined accurately without regard to the location of the applied force F on the handle 120 rearward of the first loading point 252, for example, as a function of the bending moments applied to the first strain gauge 161 and the second strain gauge 165.

In this regard, according to some example embodiments, even in instances where a handle extension (e.g., cheater bar) is used, the torque may be measured accurately. In this regard, with reference to FIG. 6, the torque wrench 100 is shown with a handle extender 180 coupled to the handle 120 of the torque wrench 100. The handle extender 180 may be a removable member that be added to the torque wrench 100 when, for example, added leverage is needed to be applied to a fastener. As such, the handle extender 180 may be configured to be removable from the handle 120 by a user or installed on the handle 120 by the user, when the user wishes to add length to the handle 120. As such, the handle extender 180 may be configured to increase a handle length of the torque wrench 100 relative to the handle length without the handle extender 180 coupled to the handle 120. In this regard, the handle length may be defined as a length from the drive axis 230 to a rearward end of the torque wrench 100, which may be the rearward end 210 of the handle 120 when no handle extender 180 is installed on the torque wrench 100 or the rearward end 250 of the handle extender 180 when the handle extender 180 is installed on the torque wrench 100. In this regard, the handle extender 180 may be configured to increase a handle length of the torque wrench 100.

The handle extender 180 may, for example, be an open-ended tube that may receive the rearward end 210 of the handle 120 into the opening of the handle extender 180. According to some example embodiments, the handle extender 180 may be coupled to the handle 120 via pins 182 and 184 that may pass through the handle extender 180 and the handle 120 to secure the handle extender to the handle 120. Other means for removably coupling the handle extender 180 to the handle 120, such as, for example, a detent engagement between the handle 120 and the handle extender 180, the handle extender 180 may press fit onto the handle 120, the handle extender 180 may be threaded such that the handle extender 180 screws onto handle 120, to the like. The handle extender 180 may extend a length of the torque wrench 100 by a distance h and may allow for a force F to be placed further away from the drive axis 230 on the handle extender 300 (i.e., allowing the distance X to extend onto the handle extender 180). However, because torque measurement can be determined accurately without regard to the location of the applied force F on the handle 120 or the even on the handle extender 180, rearward of the first loading point 252, the use of the handle extender 180 and an applied force F on the handle extender 180 does not impact the accuracy of the torque measurements.

As such, according to some example embodiments, the architecture of the torque wrench 100 may be defined in association with the distances, and the relationships between the distances described above. In this regard, a first ratio (a/m) may be defined as a first distance (a) defined between the drive axis 230 and the first strain gauge 161 (e.g., the first strain gauge alignment axis 167) divided by a second distance (m) defined between the drive axis 230 and the first loading point 252. The first ratio (a/m) may be equal to a second ratio (b/l) of a third distance (b) defined between the second loading point 254 and the second strain gauge 165 (e.g., the second strain gauge alignment axis 169) divided by a fourth distance (l) defined between the first loading point 252 and the second loading point 254.

Figure 7:
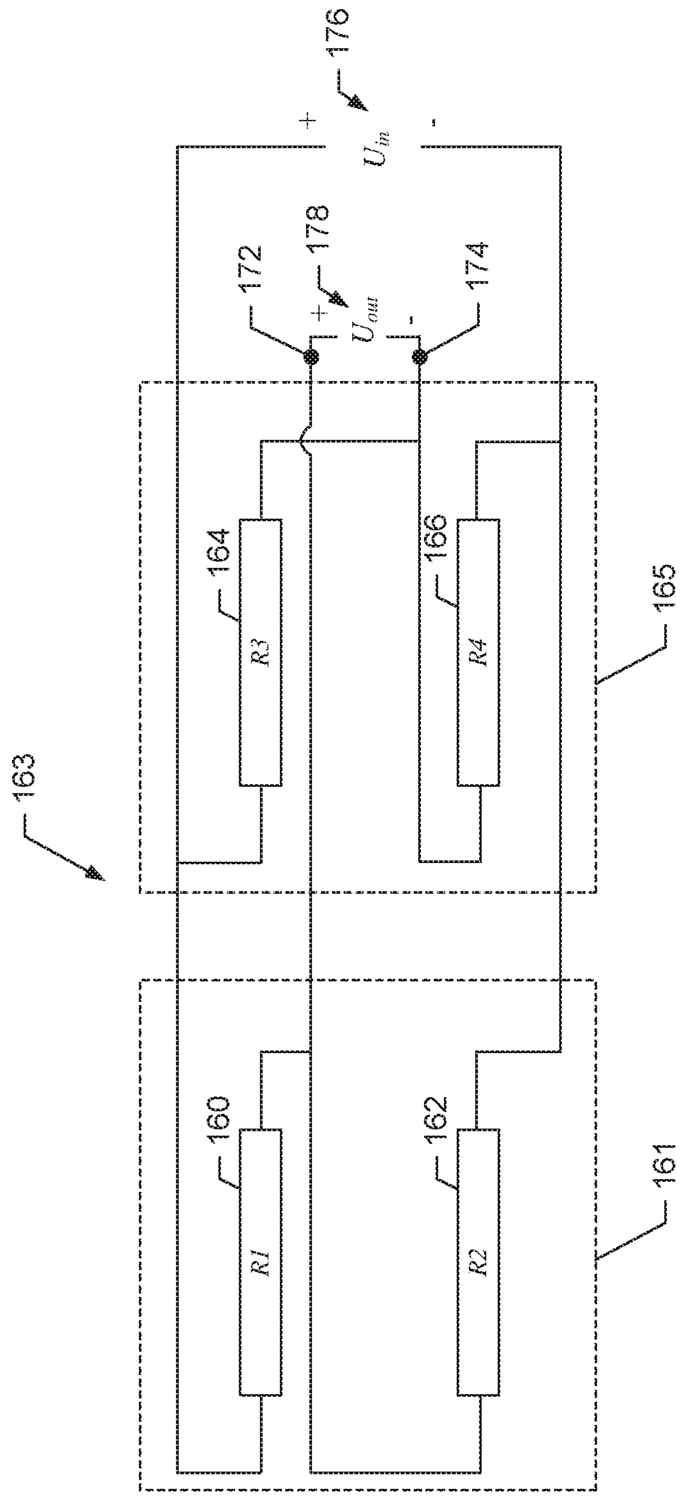
FIG. 7 illustrates a schematic of an electrical configuration of strain sensors according to some example embodiments.

As described above, the first strain gauge 161 and the second strain gauge 165 may comprise respective strain sensors that may be embodied as resistive elements that change resistance in proportion to the applied strain on the sensors. FIG. 7 illustrates an electrical schematic configuration of the first strain gauge 161 and the second strain gauge 165 (collectively referred to as the strain gauge assembly 163). In this regard, first strain gauge 161 may comprise the first strain sensor 160 represented as resistance value R1 and the second strain sensor 162 represented as resistance value R2. The second strain gauge 165 may comprise third strain sensor 164 represented as resistance value R3 and fourth strain sensor 166 represented as resistance value R4.

As shown in the strain gauge assembly 163 of FIG. 7, the first strain gauge 161 may be electrically connected in parallel with the second strain gauge 165. Further, the first strain sensor 160 may be electrically connected in series with the second strain sensor 162. Similarly, the third strain sensor 164 may be connected in electrical series with the fourth strain sensor 166. The first strain gauge 161 may also define a first measurement node 172 between the first strain sensor 160 and the second strain sensor 162, and the second strain gauge 165 may define a second measurement node 174 between the third strain sensor 164 and the fourth strain sensor 166.

In operation, a known voltage $U_{in}$ 176 may be applied across the parallel connected first strain gauge 161 and second strain gauge 165. The known voltage $U_{in}$ 176 may be furnished by, for example, a battery or the like. A voltage $U_{out}$ 178 may be an output that is based on the strain being applied the first strain gauge 161 and the second strain gauge 165. According to some example embodiments, an output or an output voltage of the strain gauge assembly 163 may be the voltage $U_{out}$ 178. Further, an output voltage of the first strain gauge 161 may be a voltage measured between the first measurement node 172 and a ground node of the electronics assembly 300. An output voltage of the second strain gauge 165 may be a voltage measured between the second measurement node 174 and a ground node of the electronics assembly 300. As further described below, processing circuitry may be electrically connected across the first measurement node 172 and the second measurement node 174 to measure the voltage $U_{out}$ 178 from the strain gauge assembly 163 for use in determining a torque measurement indicative of the amount of torque being applied by the torque wrench 100 on a fastener.

Due to electrical architecture of the strain sensors the following relationships may be defined. In this regard, since the first strain sensor 160 is disposed directly opposite the second strain sensor 162 on opposite sides of the deflection member 150, the resistance value of R1 may be the same value as R2, but with an opposite direction or sign. Similarly, since the third strain sensor 164 is disposed directly opposite the fourth strain sensor 166 on opposite sides of the deflection member 150, the resistance value of R3 may be the same value as R4, but with an opposite direction or sign. Based on these relationships appropriate substitutions may be made for determining the relationship between the strain on the strain sensors and the voltage $U_{out}$ 178. In this regard, $U_{out}$ may be defined as:

$$U_{out}=U_{ab}=U_a-U_b \quad (12).$$

In this regard, $U_a$ is the voltage between the first measurement node 172 and ground, $U_b$ is the voltage between the second measurement node 174 and ground, and $U_{ab}$ is a notation for the difference of $U_a$ and $U_b$. Substituting the resistance values into (12) yields:

$$U_{out} = \left(\frac{R+\Delta R1}{R+\Delta R1+R-\Delta R1} - \frac{R+\Delta R3}{R+\Delta R3+R-\Delta R3}\right)U_{in}. \tag{13}$$

In this regard, R is the resistance of a strain sensor at no deflection condition, ΔR1 is the resistance change in strain sensors 160 and 162, ΔR3 is the resistance change of strain sensors 164 and 166, and $U_{in}$ is the voltage applied across the nodes at 176.

Further simplifying (13) for the resistance values yields:

$$U_{out} = \frac{1}{2}\left(\frac{\Delta R1}{R} - \frac{\Delta R3}{R}\right)U_{in} = \frac{1}{2}K(\varepsilon 1 - \varepsilon 3)U_{in}. \tag{14}$$

In this regard, ε1 is the strain of the deflection member 150 at the location of first strain gauge 161, and ε3 is the strain of the deflection member 150 at the location of second strain gauge 165. Additionally, K is the sensitivity of the strain gauges (i.e., first strain gauge 161 and second strain gauge 165).

Again, further substitutions yields, in terms of bending moments:

$$U_{out} = \frac{1}{2}K\left(\frac{M1}{W*E} - \frac{M2}{W*E}\right)U_{in} = \frac{K}{2*W*E}(M1 - M2)U_{in}. \tag{15}$$

In this regard, M1 is the bending moment at the location of first strain gauge 161, and M2 is the bending moment at the location of second strain gauge 165. Further, W is the section modulus in bending of the deflection member 150, and E is the elasticity modulus of the defection member 150.

Finally, substituting from (10) yields:

$$U_{out} = \frac{K*T}{2*W*E}\left(1 - \frac{b}{l}\right)U_{in}. \tag{16}$$

As such, the relationship between the voltage $U_{out}$ 178 and the torque T can be defined and used for determining measurements of applied torque by, for example, the processing circuitry of the torque wrench 100. Accordingly, the torque T may be determined as a function of the voltage measured across the first measurement node 172 and the second measurement node 174 (i.e., voltage $U_{out}$ 178). As such, the torque T may have a defined relationship with the measured voltage.

Figure 8:
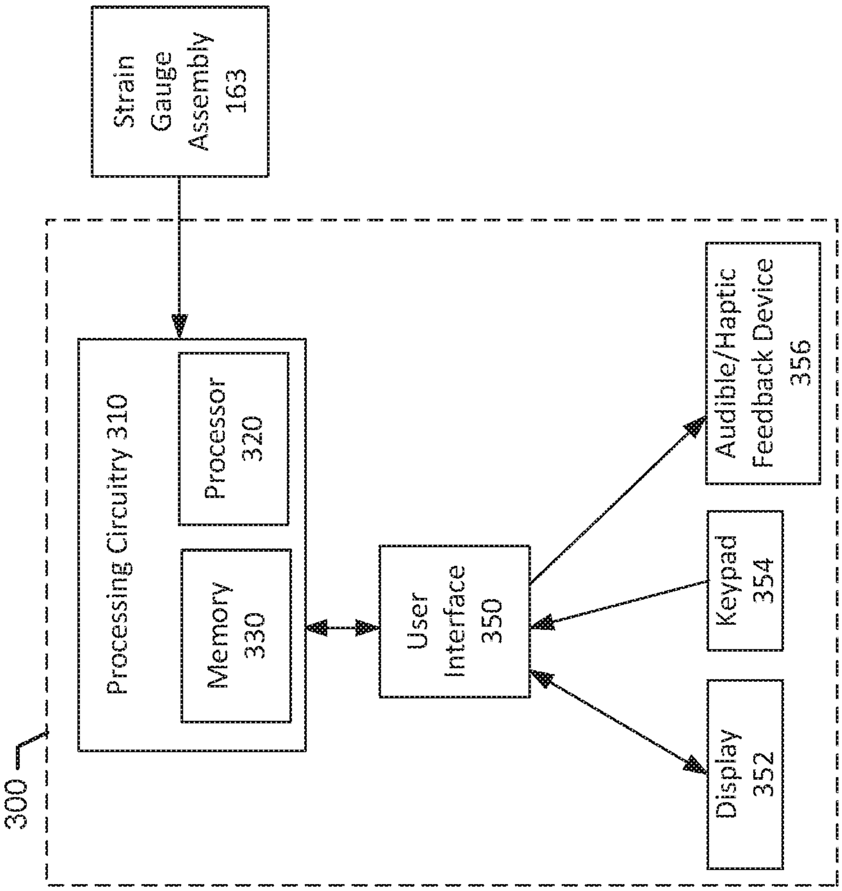
FIG. 8 illustrates a block diagram of an electronics assembly for the torque wrench of FIG. 1 according to some example embodiments.

Now referring to FIG. 8, an electronics assembly 300 of the torque wrench 100 is shown that may be configured to perform various functionalities associated with the operation of the torque wrench 100. In this regard, the electronics assembly 300, and more specifically, the processing circuitry 310, may be configured to measure an output voltage of the strain gauge assembly 163 (i.e., voltage $U_{out}$ 178) and convert the voltage measurement to a torque measurement for the torque wrench 100.

In this regard, FIG. 8 illustrates a block diagram of the electronics assembly 300, according to some example embodiments. The electronics assembly 300 comprises processing circuitry 310, which may comprise a processor 320, a memory 330, and a user interface 350. Further, the electronics assembly 300 is not limited and may include additional components not shown in FIG. 8 and the processing circuitry 310 may be operably coupled to other components of the torque wrench 100 that are not shown in FIG. 8.

According to some example embodiments, processing circuitry 310 may be in operative communication with or embody, the memory 330, the processor 320, and the user interface 350. Through configuration and operation of the memory 330, the processor 320, and the user interface 350, the processing circuitry 310 may be configurable to perform various operations as described herein, including the operations and functionalities described with respect to the torque wrench 100 and the strain gauge assembly 163. In this regard, the processing circuitry 310 may be configured to perform computational processing, memory management, user interface control and monitoring, and the like, according to an example embodiment. In some embodiments, the processing circuitry 310 may be embodied as a chip or chip set. In other words, the processing circuitry 310 may comprise one or more physical packages (e.g., chips) including materials, components, or wires on a structural assembly (e.g., a baseboard or printed circuit board). The processing circuitry 310 may be configured to receive inputs (e.g., via peripheral components), perform actions based on the inputs, and generate outputs (e.g., for provision to peripheral components). In an example embodiment, the processing circuitry 310 may include one or more instances of a processor 320, associated circuitry, and memory 330. As such, the processing circuitry 310 may be embodied as a circuit chip (e.g., an integrated circuit chip, such as a field programmable gate array (FPGA)) configured (e.g., with hardware, software or a combination of hardware and software) to perform operations described herein.

In an example embodiment, the memory 330 may include one or more non-transitory memory devices such as, for example, volatile or non-volatile memory that may be either fixed or removable. The memory 330 may be configured to store information, data, applications, instructions or the like for enabling, for example, the functionalities described with respect to the torque wrench 100. The memory 330 may operate to buffer instructions and data during operation of the processing circuitry 310 to support higher-level functionalities, and may also be configured to store instructions for execution by the processing circuitry 310. The memory 330 may also store various information including torque measurements, torque threshold settings, or the like. According to some example embodiments, various data stored in the memory 330 may be generated based on other data and stored in the memory 330 such as, for example, voltage measurements.

As mentioned above, the processing circuitry 310 may be embodied in a number of different ways. For example, the processing circuitry 310 may be embodied as various processing means such as one or more processors 320 that may be in the form of a microprocessor or other processing element, a coprocessor, a controller or various other computing or processing devices including integrated circuits such as, for example, an ASIC (application specific integrated circuit), an FPGA, or the like. In an example embodiment, the processing circuitry 310 may be configured to execute instructions stored in the memory 330 or otherwise accessible to the processing circuitry 310. As such, whether configured by hardware or by a combination of hardware and software, the processing circuitry 310 may represent an entity (e.g., physically embodied in circuitry—in the form of processing circuitry 310) capable of performing operations according to example embodiments, while configured accordingly. Thus, for example, when the processing circuitry 310 is embodied as an ASIC, FPGA, or the like, the processing circuitry 310 may be specifically configured hardware for conducting the operations described herein. Alternatively, as another example, when the processing circuitry 310 is embodied as an executor of software instructions, the instructions may specifically configure the processing circuitry 310 to perform the operations described herein.

The user interface 350 may be controlled by the processing circuitry 310 to interact with peripheral components or devices of the torque wrench 100 that can receive inputs from a user or provide outputs to a user. In this regard, via the user interface 350, the processing circuitry 310 may be configured to receive inputs from an input device which may be, for example, a touch screen display (e.g. display 352), a keypad 354, a microphone, camera or the like. The user interface 350 may also be configured to provide control and outputs to peripheral devices such as, for example, the display 352, an audible/haptic feedback device 356, or the like. The user interface 350 may also produce outputs, for example, as visual outputs on a display, audio outputs via a speaker, or the like. The audible/haptic feedback device 356 may be a sounder, speaker, vibrator, or the like that can provide sensory feedback to a user. In this regard, according to some example embodiments, the audible/haptic feedback device 356 may be configured to alert the user by providing an audible tone or a vibration when a measured torque of the torque wrench 100 is equal to or exceed a torque threshold setting, which may be input by the use via the keypad 354 and the display 352.

As such, according to some example embodiments, the processing circuitry 310 may be operably coupled to the strain gauge assembly 163 to measure an output voltage of the strain gauge assembly 163. More specifically, according to some example embodiments, the processing circuitry 310 may be electrically connected to outputs of the first strain gauge 161 and the second strain gauge 165 in the form of the first measurement node 172 and the second measurement node 174. In this regard, the processing circuitry 310 may be configured to measure a voltage (e.g., the voltage $U_{out}$ 178) via the electrical connections to the first measurement node 172 and the second measurement node 174.

Additionally, according to some example embodiments, the processing circuitry 310 may be configured to generate a torque measurement based on the voltage measured from the output of the strain gauge assembly 163 or measured across the first measurement node 172 and the second measurement node 174. The measured voltage may be used in association with the relationships and equations described above to convert or calculate a torque measurement, for example, as a function of the measured voltage. According to some example embodiments, the processing circuitry 310 may be configured to, via the user interface 350, control the display 352 to output the torque measurement on a display 352.

Further, according to some example embodiments, the processing circuitry 310 may be configured to receive a torque threshold setting from a user, for example, via the keypad 354. The processing circuitry 310 may be configured to store the torque threshold setting in, for example, the memory 330. Further, the processing circuitry 310 may be configured to periodically determine a current torque measurement being applied to a fastener by the torque wrench 100 and compare the current torque measurement to the torque threshold setting, for example, to determine when the torque applied by the torque wrench 100 on the fastener is equal to or exceeds the torque threshold setting. According to some example embodiments, the torque threshold setting may be stored in the memory 330 in a form that can be directly compared to the voltage measured from the output of the strain gauge assembly 163, which may avoid having to convert the voltage measurement each time a comparison is performed. As such, the measured voltage or a conversion of the measured voltage may be compared to the torque threshold setting. According to some example embodiments, in response to the measured voltage or a conversion of the measured voltage being equal to or exceeding the torque threshold setting, the processing circuitry 310 may be configured to output a feedback alert (e.g., a sound, vibration, visual indicator, or the like), for example, via the audible/haptic feedback device 356 or the display 352 of the user interface 350.

Figure 9:
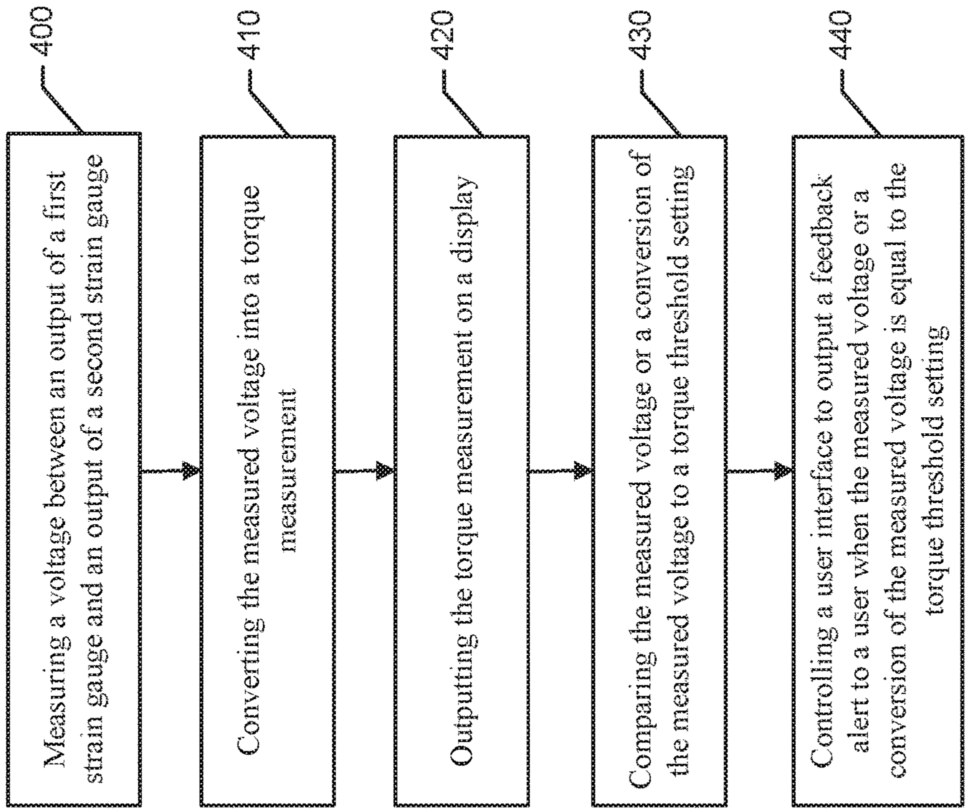
FIG. 9 illustrates a flowchart of an example method for measuring a torque applied by a torque wrench to a fastener according to some example embodiments.

Now referring to FIG. 9, a flowchart of an example method for measuring a torque applied by a drive head of a torque wrench to a fastener is provided. In this regard, the torque wrench (e.g., torque wrench 100) may comprise a deflection member coupled to the drive head. The example method may comprise, at 400, measuring, by processing circuitry, a voltage between an output of a first strain gauge (e.g., first measurement node 172) and an output of a second strain gauge (e.g., second measurement node 174). The measured voltage may be based on a torque being applied to the fastener. The first strain gauge may be coupled to the deflection member between the drive head and a first loading point. The second strain gauge may be coupled to the deflection member between the first loading point and a second loading point. The first loading point and the second loading point may be points of mechanical coupling between the deflection member and a handle of the torque wrench. According to some example embodiments, the example method may also include converting the measured voltage into a torque measurement at 410.

According to some example embodiments, the example method may further comprise, at 420, outputting the torque measurement on a display. Additionally or alternatively, the example method may include, at 430, comparing the measured voltage or a conversion of the measured voltage to a torque threshold setting, and, at 440, controlling a user interface to output a feedback alert to a user when the measured voltage or a conversion of the measured voltage is equal to the torque threshold setting.

Figure 10:
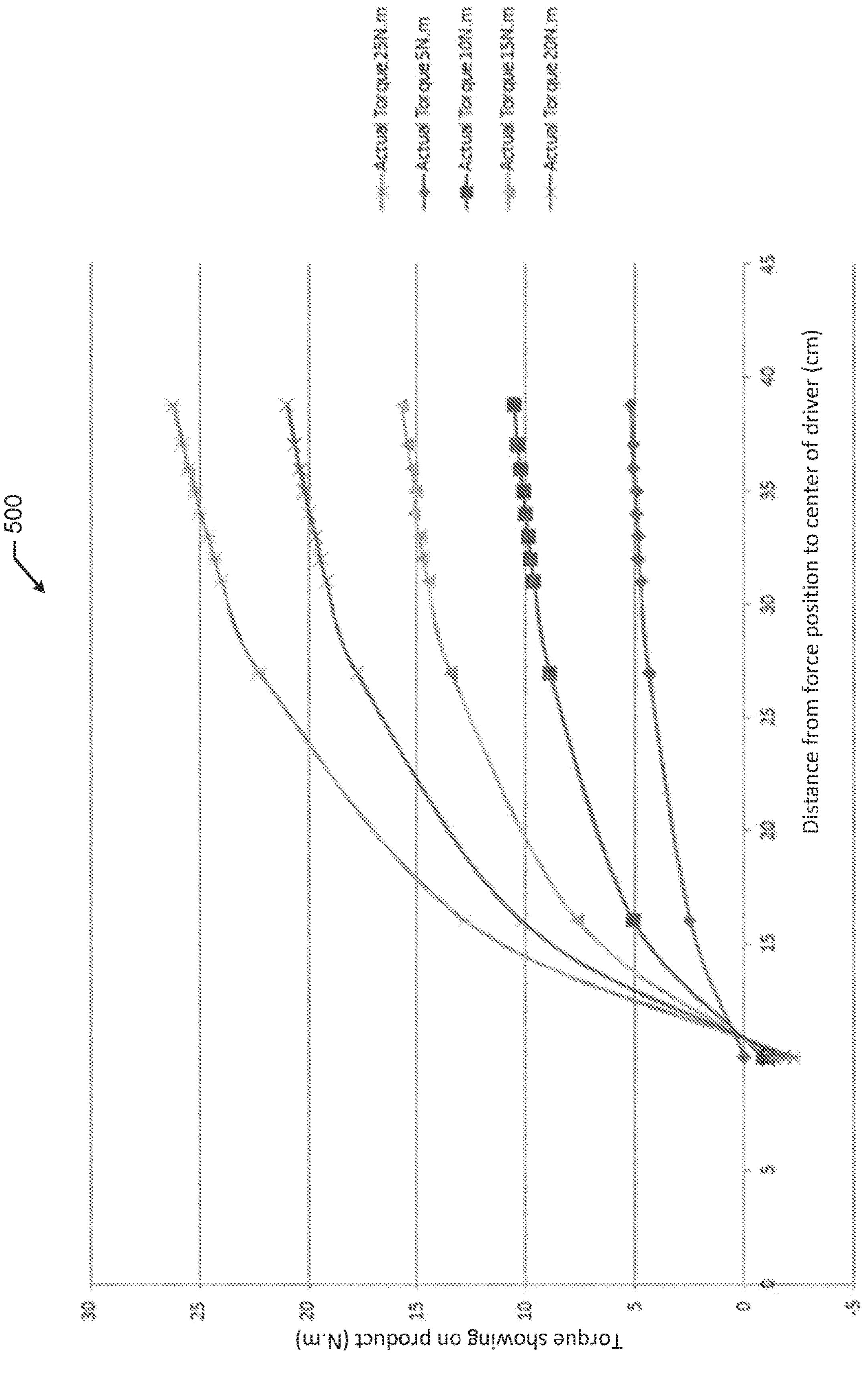
FIG. 10 illustrates a graph of torque measurements taken with a force applied at different locations on a conventional torque wrench.

Based on the forgoing, according to some example embodiments, an improved torque wrench 100 is provided that can improve the accuracy of torque measurements when a force is applied at different locations on the torque wrench 100. In this regard, FIG. 10 illustrates a graph 500 showing the variation in measurements that can occur using a conventional torque wrench that does not incorporate aspects of the example embodiments described herein. As can be seen in FIG. 10, as the applied force moves closer to the center of the driver/the drive axis, the accuracy of the torque measurements begin to degrade rapidly.

Figure 11:
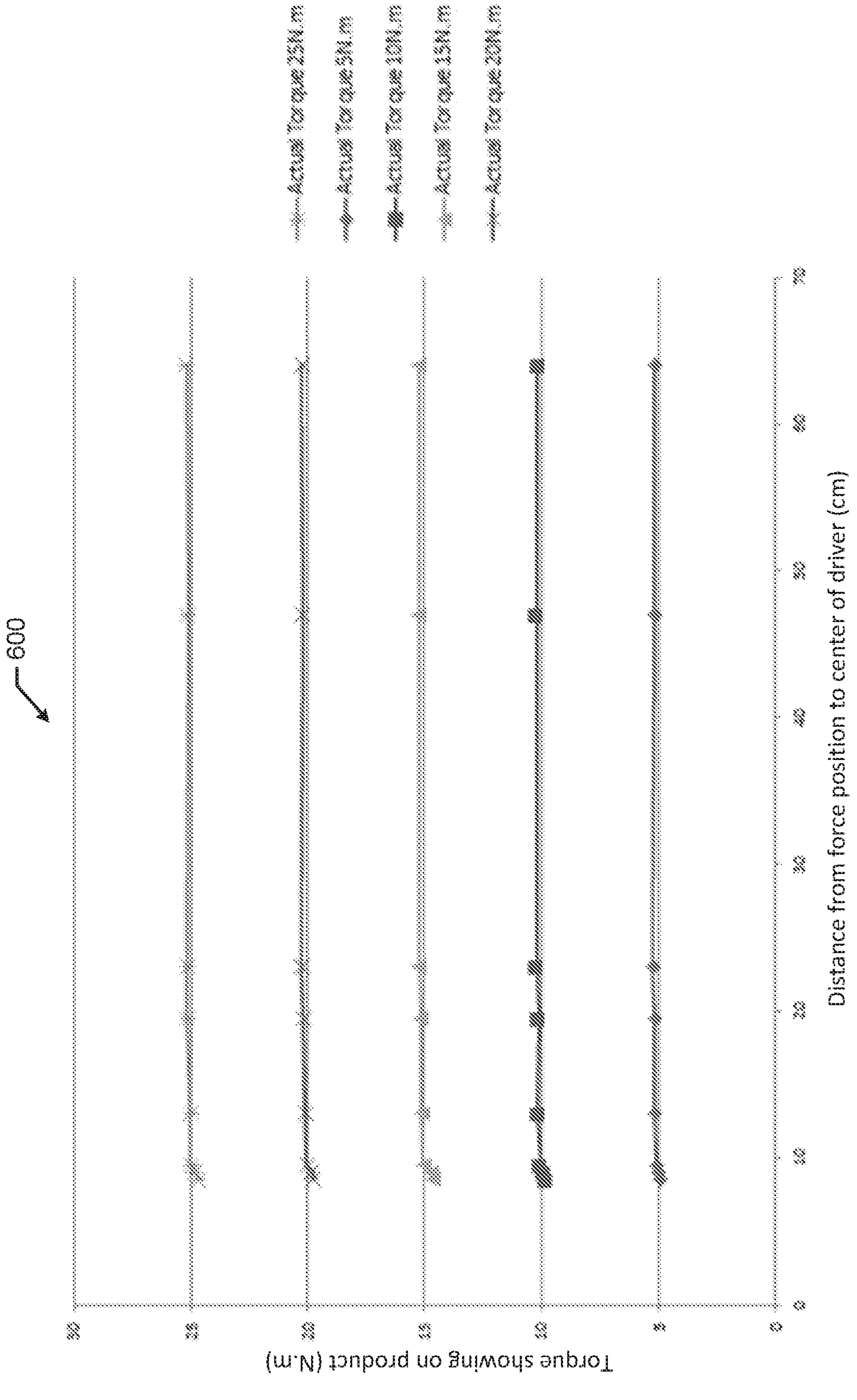
FIG. 11 illustrates a graph of torque measurements taken with a force applied at different locations on a torque wrench according to some example embodiments.

FIG. 11 illustrates the performance of a torque wrench, such as torque wrench 100, that has incorporated aspects of the example embodiments described herein. In this regard, FIG. 11 shows a graph 600 of torque measurements taken with different applied torques and at different positions on the torque wrench. As can be seen, unlike the graph 500, the torque measurements remain consistently accurate, even as the force position moves closer to the center of the driver/the drive axis.

Having described various aspects of example embodiments, some additional example embodiments will now be described. According to some example embodiments, an example torque wrench is provided. The torque wrench may comprise a drive head configured to engage with a tool for rotating a fastener. The drive head may have a drive axis about which the drive head rotates when rotating the fastener. Further, the torque wrench may comprise a deflection member coupled to the drive head, and an outer body coupled to the deflection member at a first loading point and a second loading point. The torque wrench may also comprise a first strain gauge coupled to the deflection member between the drive head and the first loading point, and a second strain gauge coupled to the deflection member between the first loading point and the second loading point.

Additionally, according to some example embodiments, a first ratio of a first distance between the drive axis and the first strain gauge divided by a second distance between the drive axis and the first loading point is equal to a second ratio of a third distance between the second loading point and the second strain gauge divided by a fourth distance between the first loading point and the second loading point. Additionally or alternatively, according to some example embodiments, the first strain gauge may comprise a first strain sensor and a second strain sensor. The second strain gauge may comprise a third strain sensor and a fourth strain sensor. The first strain sensor may be disposed on a first side of the deflection member and the second strain sensor may be disposed on a second side of the deflection member. The first side of the deflection member may be opposite the second side of the deflection member. Further, the third strain sensor may be disposed on the first side of the deflection member and the fourth strain sensor may be disposed on the second side of the deflection member.

Additionally or alternatively, according to some example embodiments, the first strain sensor and second strain sensor may be symmetrical about a first strain gauge alignment axis, and the third strain sensor and the fourth strain sensor are symmetrical about a second strain gauge alignment axis. Additionally or alternatively, an electrical resistance of the first, second, third, or fourth strain sensor may vary in proportion to an amount of strain applied to the deflection member at a location where the respective strain sensor is coupled to the deflection member. Additionally or alternatively, the first strain sensor is electrically connected in series with the second strain sensor, and the third strain sensor is electrically connected in series with the fourth strain sensor. Additionally or alternatively, the first strain gauge may define a first measurement node disposed electrically between the first strain sensor and the second strain sensor, and the second strain gauge may define a second measurement node disposed electrically between the third strain sensor and the fourth strain sensor. Additionally or alternatively, the torque wrench may comprise processing circuitry operably coupled to the first measurement node and the second measurement node. The processing circuitry may be configured to generate a torque measurement based on a voltage measured between the first measurement node and the second measurement node. Additionally or alternatively, the first strain gauge and the second strain gauge may be electrically connected in parallel. Additionally or alternatively, the outer body may comprise an elongate handle. The elongate handle may be coupled to a handle extender. The handle extender may be configured to increase a handle length of the torque wrench. Additionally or alternatively, the outer body may be coupled to the deflection member at the first loading point by a first pin that passes through a first opening in the outer body and a first opening in the deflection member, and the outer body may be coupled to the deflection member at the second loading point by a second pin that passes through a second opening in the outer body and a second opening in the deflection member.

According to some example embodiments, another example torque wrench is provided. The torque wrench may comprise a drive head configured to engage with a tool for rotating a fastener. The drive head may have a drive axis about which the drive head rotates when rotating the fastener. The torque wrench may also comprise a deflection member coupled to the drive head and a handle coupled to the deflection member at a first loading point and a second loading point. The torque wrench may further comprise a first strain gauge coupled to the deflection member between the drive head and the first loading point, and a second strain gauge coupled to the deflection member between the first loading point and the second loading point. Additionally, the torque wrench may comprise processing circuitry electrically coupled to the first strain gauge and the second strain gauge and configured to measure a voltage between an output of the first strain gauge and an output of the second strain gauge. The voltage may be based on and have a quantitative relationship to a torque being applied to the fastener.

Additionally, according to some example embodiments, the processing circuitry may be configured to convert the measured voltage into a torque measurement, and output the torque measurement on a display. Additionally or alternatively, according to some example embodiments, the processing circuitry may be further configured to compare the measured voltage or a conversion of the measured voltage to a torque threshold setting, and control a user interface to output a feedback alert when the measured voltage or a conversion of the measured voltage is equal to the torque threshold setting. Additionally or alternatively, according to some example embodiments, a first ratio of a first distance between the drive axis and the first strain gauge divided by a second distance between the drive axis and the first loading point is equal to a second ratio of a third distance between the second loading point and the second strain gauge divided by a fourth distance between the first loading point and the second loading point. Additionally or alternatively, according to some example embodiments, the first strain gauge and the second strain gauge are electrically connected in parallel. Additionally or alternatively, the first strain gauge and the second strain gauge may comprise resistive elements having an electrical resistance that varies in proportion to an amount of strain applied to the resistive elements. Additionally or alternatively, according to some example embodiments, the handle may comprise a tube and the deflection member may be disposed within the tube. Additionally or alternatively, according to some example embodiments, the handle may be coupled to a handle extender. The handle extender may be configured to increase a handle length of the torque wrench.

According to some example embodiments, an example method for measuring a torque applied by a drive head of a torque wrench to a fastener is also provided. The torque wrench may comprise a deflection member coupled to the drive head. The method may comprise measuring, by processing circuitry, a voltage between an output of a first strain gauge and an output of a second strain gauge. In this regard, the voltage may based on a torque being applied to the fastener. The first strain gauge may be coupled to the deflection member between the drive head and a first loading point, and the second strain gauge may be coupled to the deflection member between the first loading point and a second loading point. The first loading point and the second loading point may be points of mechanical coupling between the deflection member and a handle of the torque wrench. The method may also comprise converting the measured voltage into a torque measurement.

Additionally, according to some example embodiments, the method may further comprise outputting the torque measurement on a display, comparing the measured voltage or a conversion of the measured voltage to a torque threshold setting, and controlling a user interface to output a feedback alert to a user when the measured voltage or a conversion of the measured voltage is equal to the torque threshold setting. Additionally or alternatively, according to some example embodiments, a first ratio of a first distance between a drive axis of the drive head and the first strain gauge divided by a second distance between the drive axis and the first loading point is equal to a second ratio of a third distance between the second loading point and the second strain gauge divided by a fourth distance between the first loading point and the second loading point.

According to some example embodiments, a torque wrench may comprise a drive head configured to engage with a tool for rotating a fastener. The drive head may have a drive axis about which the drive head rotates when rotating the fastener. The torque wrench may also comprise a deflection member coupled to the drive head, a handle coupled to the deflection member, and a strain gauge assembly coupled to the deflection member. The strain gauge assembly may be configured to measure strain on the deflection member as an indication of a torque being applied to the fastener by the torque wrench. The torque wrench may further comprise a handle extender coupled to the handle. The handle extender may be configured to be removable from the handle by a user or installed on the handle by the user. The handle extender may be configured to increase a handle length of the torque wrench relative to the handle length without the handle extender coupled to the handle. Additionally, the handle may be coupled to the deflection member at a first loading point and a second loading point. Further, the strain gauge assembly may comprise a first strain gauge coupled to the deflection member between the drive head and the first loading point, and a second strain gauge coupled to the deflection member between the first loading point and the second loading point.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A torque wrench comprising:

a drive head configured to engage with a tool for rotating a fastener, the drive head having a drive axis about which the drive head rotates when rotating the fastener;

a deflection member coupled to the drive head;

an outer body coupled to the deflection member at a first loading point and a second loading point;

a first strain gauge coupled to the deflection member between the drive head and the first loading point; and a second strain gauge coupled to the deflection member between the first loading point and the second loading point.

2. The torque wrench of claim 1, wherein a first ratio of a first distance between the drive axis and the first strain gauge divided by a second distance between the drive axis and the first loading point is equal to a second ratio of a third distance between the second loading point and the second strain gauge divided by a fourth distance between the first loading point and the second loading point.

3. The torque wrench of claim 1, wherein the first strain gauge comprises at least a first strain sensor and a second strain sensor;

wherein the second strain gauge comprises a third strain sensor and a fourth strain sensor;

wherein the first strain sensor is disposed on a first side of the deflection member and the second strain sensor is disposed on a second side of the deflection member, the first side of the deflection member being opposite the second side of the deflection member; and wherein the third strain sensor is disposed on the first side of the deflection member and the fourth strain sensor is disposed on the second side of the deflection member.

4. The torque wrench of claim 3, wherein the first strain sensor and second strain sensor are symmetrical about a first strain gauge alignment axis; and wherein the third strain sensor and the fourth strain sensor are symmetrical about a second strain gauge alignment axis.

5. The torque wrench of claim 3, wherein an electrical resistance of the first strain sensor varies in proportion to an amount of strain applied to the deflection member at a location where the first strain sensor is coupled to the deflection member.

6. The torque wrench of claim 3, wherein the first strain sensor is electrically connected in series with the second strain sensor; and wherein the third strain sensor is electrically connected in series with the fourth strain sensor.

7. The torque wrench of claim 6, wherein the first strain gauge defines a first measurement node disposed electrically between the first strain sensor and the second strain sensor; and wherein the second strain gauge defines a second measurement node disposed electrically between the third strain sensor and the fourth strain sensor.

8. The torque wrench of claim 7 further comprising processing circuitry operably coupled to the first measurement node and the second measurement node;

wherein the processing circuitry is configured to generate a torque measurement based on a voltage measured between the first measurement node and the second measurement node.

9. The torque wrench of claim 1, wherein the first strain gauge and the second strain gauge are electrically connected in parallel.

10. The torque wrench of claim 1, wherein the outer body comprises an elongate handle coupled to a handle extender, the handle extender being configured to increase a handle length of the torque wrench.

11. The torque wrench of claim 1, wherein the outer body is coupled to the deflection member at the first loading point by a first pin that passes through a first opening in the outer body and a first opening in the deflection member; and wherein the outer body is coupled to the deflection member at the second loading point by a second pin that passes through a second opening in the outer body and a second opening in the deflection member.

12. A torque wrench comprising:

a drive head configured to engage with a tool for rotating a fastener, the drive head having a drive axis about which the drive head rotates when rotating the fastener;

a deflection member coupled to the drive head;

a handle coupled to the deflection member at a first loading point and a second loading point;

a first strain gauge coupled to the deflection member between the drive head and the first loading point;

a second strain gauge coupled to the deflection member between the first loading point and the second loading point;

processing circuitry electrically coupled to the first strain gauge and the second strain gauge and configured to measure a voltage between an output of the first strain gauge and an output of the second strain gauge, the measured voltage based on a torque being applied to the fastener.

13. The torque wrench of claim 12, wherein the processing circuitry is configured to convert the measured voltage into a torque measurement, and output the torque measurement on a display.

14. The torque wrench of claim 12, wherein the processing circuitry is further configured to:

compare the measured voltage or a conversion of the measured voltage to a torque threshold setting; and control a user interface to output a feedback alert when the measured voltage or a conversion of the measured voltage is equal to the torque threshold setting.

15. The torque wrench of claim 12, wherein a first ratio of a first distance between the drive axis and the first strain gauge divided by a second distance between the drive axis and the first loading point is equal to a second ratio of a third distance between the second loading point and the second strain gauge divided by a fourth distance between the first loading point and the second loading point.

16. The torque wrench of claim 12, wherein the first strain gauge and the second strain gauge are electrically connected in parallel.

17. The torque wrench of claim 12, wherein the first strain gauge and the second strain gauge comprise resistive elements having an electrical resistance that varies in proportion to an amount of strain applied to the resistive elements.

18. The toque wrench of claim 12, wherein the handle is coupled to a handle extender, the handle extender being configured to increase a handle length of the torque wrench.

19. A torque wrench comprising:

a drive head configured to engage with a tool for rotating a fastener, the drive head having a drive axis about which the drive head rotates when rotating the fastener;

a deflection member coupled to the drive head;

a handle coupled to the deflection member;

a strain gauge assembly coupled to the deflection member, the strain gauge assembly being configured to measure strain on the deflection member as an indication of a torque being applied to the fastener by the torque wrench; and a handle extender coupled to the handle, the handle extender configured to be removable from the handle by a user and installed on the handle by the user, the handle extender being configured to increase a handle length of the torque wrench relative to the handle length without the handle extender coupled to the handle.

20. A torque wrench comprising:

a drive head configured to engage with a tool for rotating a fastener, the drive head having a drive axis about which the drive head rotates when rotating the fastener;

a deflection member coupled to the drive head;

a handle coupled to the deflection member;

a strain gauge assembly coupled to the deflection member, the strain gauge assembly being configured to measure strain on the deflection member as an indication of a torque being applied to the fastener by the torque wrench; and a handle extender coupled to the handle, the handle extender configured to be removable from the handle by a user or installed on the handle by the user, the handle extender being configured to increase a handle length of the torque wrench relative to the handle length without the handle extender coupled to the handle;

wherein the handle is coupled to the deflection member at a first loading point and a second loading point; and wherein the strain gauge assembly comprises a first strain gauge coupled to the deflection member between the drive head and the first loading point, and a second strain gauge coupled to the deflection member between the first loading point and the second loading point.

21. A method for measuring a torque applied by a drive head of a torque wrench too a fastener, the torque wrench comprising a deflection member coupled to the drive head, the method comprising:

measuring, by processing circuitry, a voltage between an output of a first strain gauge and an output of a second strain gauge, the voltage being based on a torque being applied to the fastener, the first strain gauge being coupled to the deflection member between the drive head and a first loading point, the second strain gauge being coupled to the deflection member between the first loading point and a second loading point, the first loading point and the second loading point being points of mechanical coupling between the deflection member and a handle of the torque wrench; and converting the measured voltage into a torque measurement.

* * * * *